Oct. 8, 1963 R. TAIT ETAL 3,106,368
CABLE WINDING APPARATUS

Filed April 5, 1960 4 Sheets-Sheet 1

FIG. I.

INVENTORS
Robert Tait
Albert Edward Wright
BY
Lawson and Taylor

Oct. 8, 1963  R. TAIT ETAL  3,106,368
CABLE WINDING APPARATUS

Filed April 5, 1960  4 Sheets-Sheet 3

INVENTORS
Robert Tait
Albert Edward Wright
BY
Larson and Taylor

INVENTORS
Robert Tait
Albert Edward Wright
BY
Lawson and Taylor 3,106,368
CABLE WINDING APPARATUS
Robert Tait, Dorset, and Albert Edward Wright, Cumberland, England, assignors to United Kingdom Atomic Energy Authority, London, England
Filed Apr. 5, 1960, Ser. No. 20,045
Claims priority, application Great Britain Apr. 20, 1959
2 Claims. (Cl. 242—107.1)

This invention relates to winding apparatus suitable for storage of flexible conductors such as electrical cables or fluid conducting hoses and hereinafter referred to as "cable winding apparatus."

In supplying mobile equipment from a static point with electrical connections, gas or water supply, a flexible cable or hose may be employed which is stored on a rotatable reel and payed off as required by rotation of the reel. In such an arrangement the cable or hose will have a first part which is wound on the reel and leads to the mobile equipment and a second part which leads from the reel to the static supply point. It follows that if the cable or hose leads directly from the reel to the supply point that length of the cable or hose between the reel and the supply point will be twisted as the reel rotates. In the absence of any rotatable joints in the cable or hose the number of turns stored on the reel will be limited by the above twisting effect.

In any event, continual use with the consequent continual twisting may give rise to internal damage, pinching, or even fracture of the cable or hose. The problem can be overcome by using rotatable joints in the case of an electric cable, for example by providing slip ring connections at the reel to accommodate for rotation of the reel. In the case of hoses supplying fluid the problem can be overcome by the provision of a rotatable manifold, sometimes referred to as a "fluid slip ring." This "slip ring" method is not suitable for a multicore electrical cable such as is used in supplying a television camera, because the number of slip rings required is prohibitive and difficulties arise due to varying contact resistance of the slip rings. With fluid, the "slip ring" method involves the use of a gland from which leakage can occur and leakage is not acceptable where the fluid being handled is of a toxic or otherwise dangerous nature.

According to the invention, a cable winding apparatus comprises a rotatable cable storage reel, a cable secured to the reel at an intermediate point along the length of the cable to divide it into two parts, the first part being on the reel and the second part being off the reel and retained in the form of a flat spiral coil so that the number of turns and the diameter of the turns in the flat spiral coil changes as the reel is rotated to pay off or draw in the first part of the cable from or to the reel, wherein there is provided means for assisting increasing of the diameter of the turns of the flat spiral coil as it unwinds.

The said means preferably comprises a metallic spring strip interwound with and contacting the turns of the flat spiral coil.

It is conveniently arranged that the flat spiral coil is tightly wound, together with the spring strip, when the first part of the cable is wholly wound on the reel and thus as the first part of the cable is payed off from the reel the flat spiral coil unwinds to a lesser number of turns of larger diameter with the assistance afforded by corresponding unwinding of the spring strip.

Alternatively it can be arranged that the flat spiral coil is tightly wound when the first part of the cable is wholly unwound from the reel and as the cable is wound on the reel the flat spiral coil unwinds to a lesser number of turns of larger diameter with the assistance afforded by corresponding unwinding of the spring strip.

As a further feature it can be arranged that the flat spiral coil is tightly wound when the first part of the cable is wholly wound on the reel and as the first part of the cable is payed off from the reel the flat spiral coil unwinds to a lesser number of turns of larger diameter with the assistance afforded by corresponding unwinding of the spring strip until when half of the first part of the cable is payed off from the reel the flat spiral coil is unwound to a single turn and then as further cable is payed off from the reel the flat spiral coil is rewound in the opposite sense together with the spring strip so that when all the cable is payed off from the reel the flat spiral coil is again tightly wound.

One embodiment of the invention will now be described by way of example with reference to the accompanying drawings in which.

Figure 1:
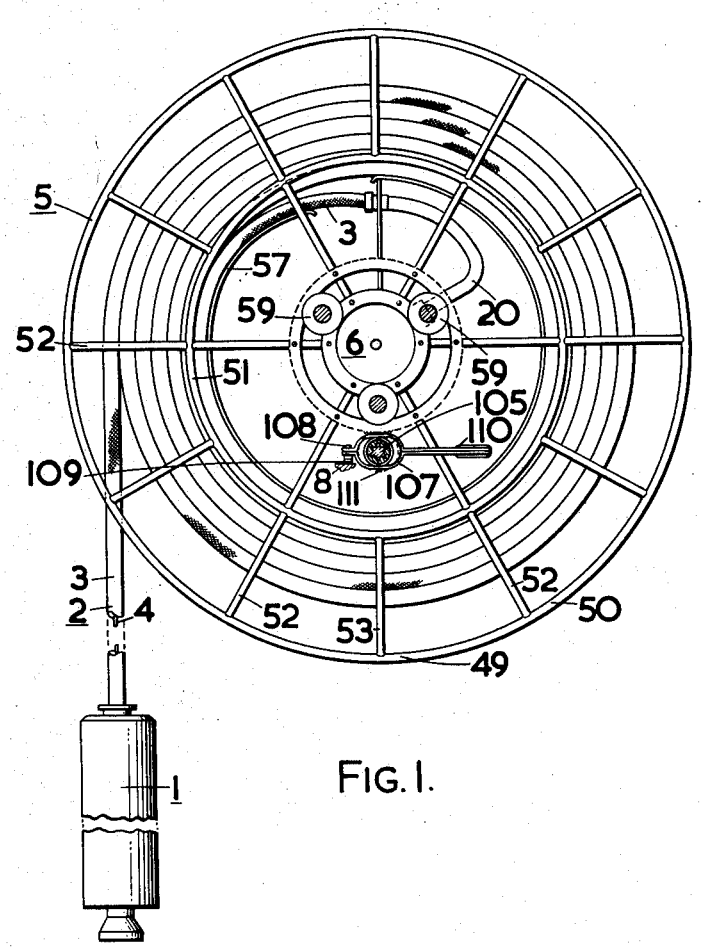
FIG. 1 is a side view in section on line I—I of FIGURE 2.

In FIG. 1 there is shown a television camera 1 of elongated cylindrical form adapted to be lowered within a narrow vertical channel in the core structure of a nuclear reactor so that objects in the channel can be located and examined and so that the channel itself can be viewed. The camera 1 is suspended from a cable 2 which has the dual function of providing support for the camera 1 and supplying electrical connections and coolant gas to the camera 1. The cable 2 which comprises an armoured hose 3 containing a multicore television cable 4 is stored on a rotatable hose reel 5 of tubular construction. The reel 5 is supported by a cylindrical hub 6 which is rotatably mounted between parallel plates 7 and 8 forming part of a mobile hose trolley (not shown in the drawings).

Figure 2:
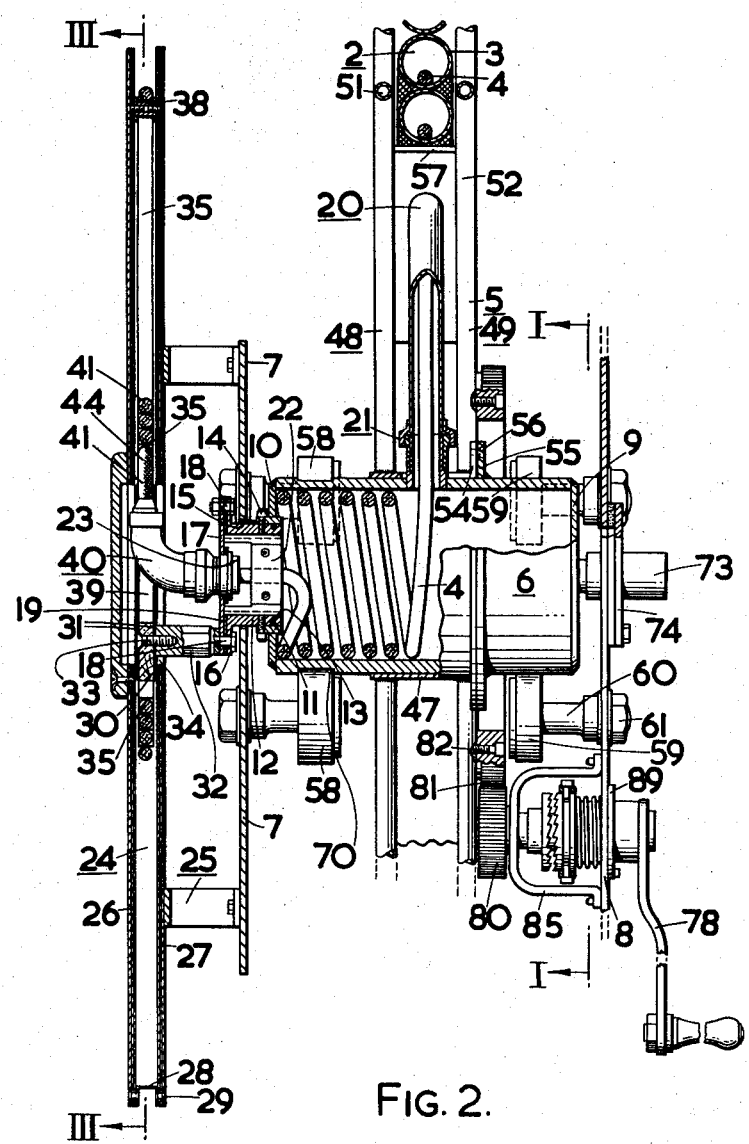
FIG. 2 is a fragmentary end view in medial section drawn to a larger scale than FIGURE 1.

As shown in FIG. 2, the hub 6 has a circular end plate 9 and an annular end plate 10. A coupling sleeve 11 is welded to the annular end plate 10 and an extension sleeve 12 is sealed inside the sleeve 11 by a toroidal joint ring 13. The sleeve 12 which is fixed to the sleeve 11 by bolts 14 projects through a central opening 15 in the plate 7 and has an external end flange 16. A cover plate 17 is fixed to the sleeve 12 at the flange 16 by bolts 18 and a gasket 19 effects sealing between the cover plate 17 and the flange 16.

The hose 3 connects with a curved pipe 20 leading into the hub 6. The pipe 20 connects with the hub 6 through a gas tight connection 21 and the multicore television cable 4 passes from the hose 3 through the pipe 20 and is coiled inside the hub 6. The cable 4 is clamped inside the sleeve 12 by a cable clamp 22 and connects with a socket 23 adapted to engage a curved twenty-five pin conector plug 40. The socket 23 is mounted and sealed on the cover plate 17.

Figure 3:
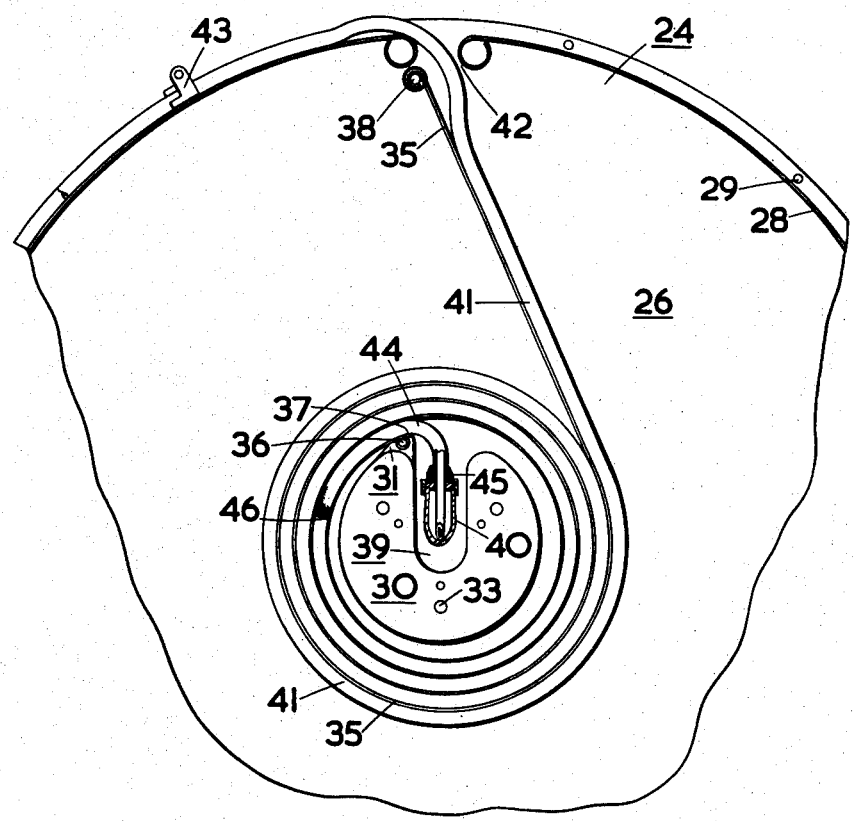
FIG. 3 is a fragmentary side view in section on line III—III of FIGURE 2.

Referring to FIG. 3 in conjunction with FIG. 2, a shallow circular drum 24 is mounted on the plate 7 by brackets 25. The drum 24 comprises circular side plates 26 and 27 of laminated plastic material and a circumferential channel member 28 is fixed between the side plates 26 and 27 by rivets 29. A circular block 30 of hardwood is situated centrally in the drum 24. The block 30 which has sheet metal facings 31 is mounted on three pillars 32 by screws 33. The pillars 32 project through a central opening 34 in the side plate 27 and are attached to the sleeve 12 at the flange 16 by three of the bolts 18. A spiral spring 35 fabricated from strip steel is coiled between the side plates 26 and 27 around the block 30. The spring 35 is attached at its inner end to the block 30 by a pin 36 which is fitted between extensions 37 of the sheet metal facings 31. The spring 35 is attached at its outer end to a pin 38 extending between the side plates 26 and 27 adjacent to the channel member 28.

The block 30 has a radial slot 39 to admit the end of the curved twenty-five pin connector plug 40 fitting the connector socket 23. A multicore television cable 41 connecting with the plug 40 is wound between the turns of the spring 35 and passes out through a gap 42 in the channel member 28. The cable 41 is fixed to the channel member 28 by a cable clamp 43. The end of the television cable 41 adjacent to the plug 40 is covered by a wire mesh stocking 44. The stocking 44 is clamped at one end to the plug 40 by a ferrule 45 and is bound at its other end by a wire binding 46.

The reel 5 comprises a central sleeve 47 supporting two side frames 48 and 49 of tubular construction. The side frames 48 and 49 each comprise outer and inner hoop shaped members 50 and 51 connected by six radial spokes 52 and six radial stiffening struts 53. As shown in FIG. 2 the spokes 52 are welded to the sleeve 47 which is a sliding fit on the hub 6. The sleeve 47 has an end flange 54 and the hub 6 has an external flange 55. The reel 5 is fixed on the hub 6 by bolts 56 connecting the flanges 54 and 55. A circular flange 57 is welded to the spokes 52 between the frames 48 and 49 and the cable 2 is wound between the frames 48 and 49 around the flange 57. The reel 5 is supported via the hub 6 by three rollers 58 mounted on the plate 7 and three rollers 59 mounted on the plate 8. The individual mounting of the rollers 58 and 59 is identical in all respects and it is sufficient to refer to that roller 59 shown in section in FIG. 4. The roller 59 is mounted on a stub shaft 60 which is fixed at one end to the plate 8 by a nut and washer 61. The stub shaft 60 has a step 62 at its other end to locate the inner ring 63 of a ball race 64. The outer ring 65 of the ball race 64 is a push fit in the roller 59. A locking nut 66 on the shaft 60 retains the inner ring 63 of the ball race 64 while the roller 59 has an internal dust sealing flange 67 and is fitted with a cover plate 68 retained by bolts 69. The rollers 58 bear in a circumferential groove 70 in the hub 6 thus providing for lateral location of the reel 5.

Figure 4:
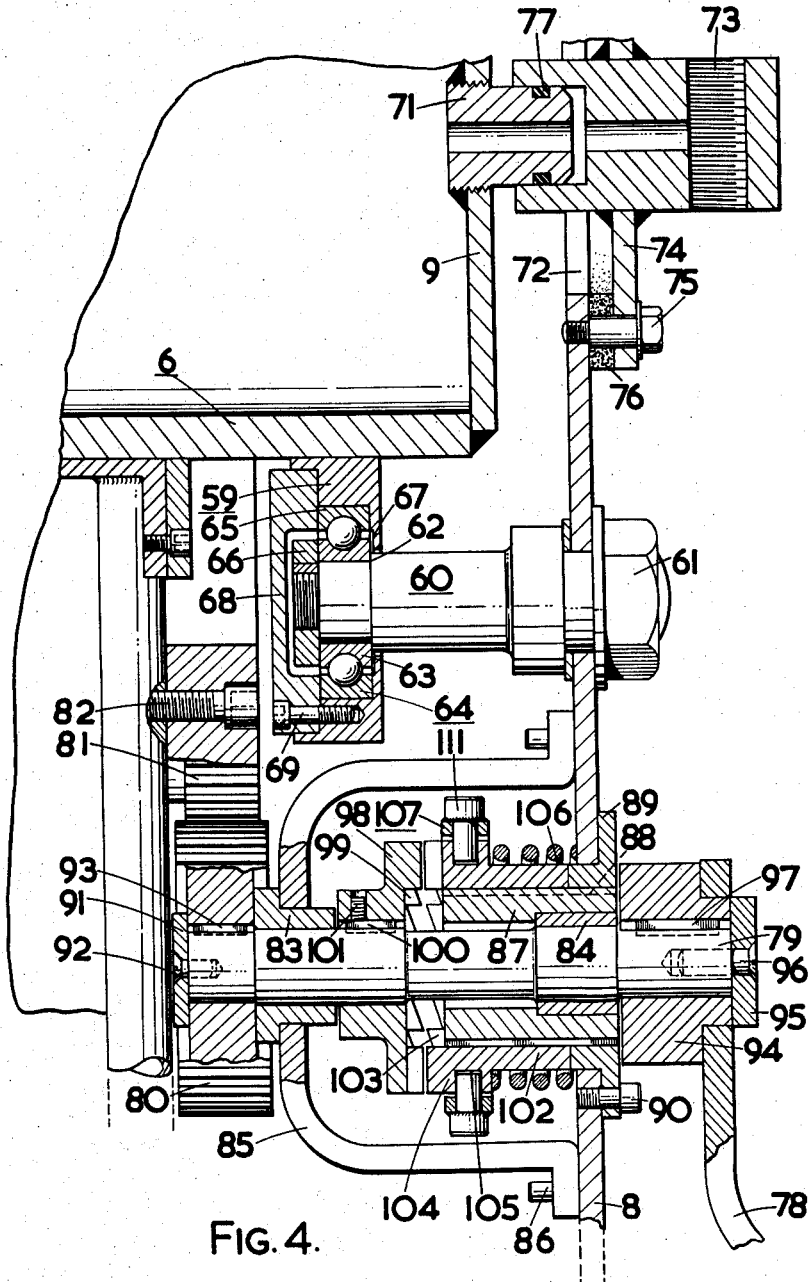
FIG. 4 is a fragmentary end view in medial section of a portion of FIGURE 2 and drawn to a larger scale.

As shown in FIG. 4, a cylindrical bush 71 is welded to the circular end plate 9 of the hub 6 and projects through an opening 72 in the plate 8 into a gas connector socket 73 mounted on the plate 8. The socket 73 is welded to a plate 74 which is fixed to the plate 8 by bolts 75. A rubber mounting ring 76 is interposed between the plate 8 and the plate 74. The bush 71 is sealed in the socket 73 by a rubber O-ring 77.

The reel 5 is rotated by operating a crank handle 78 fixed to a shaft 79 which carries a pinion gear 80 engaging with a ring gear 81 fixed to the reel 5 by bolts 82. The shaft 79 is supported in bearing bushes 83 and 84. The bearing bush 83 is press fitted in a U-shaped bracket 85 fixed to the plate 8 by bolts 86. The bearing bush 84 is press fitted in a sleeve 87 which has external splines 88 and is supported by an internally splined boss 89 fixed to the plate 8 by bolts 90.

A plate 91 fixed to the shaft 79 by a bolt 92 retains the pinion gear 80 which is prevented from rotating on the shaft 79 by a key 93. The crank handle 78 is mounted on the shaft 74 by a boss 94. A plate 95 fixed to the shaft 79 by a bolt 96 retains the crank handle 78 which is prevented from rotating on the shaft 79 by a key 97 fitting in the boss 94. A member 98 having ratchet teeth 99 is fixed on the shaft 79 by a key 100 and a grub screw 101. An internally splined sleeve 102 which is slidable on the externally splined sleeve 87 has ratchet teeth 103 complementary to the ratchet teeth 99 on the member 98. An external end flange 104 on the sleeve 102 has a circumferential groove 105 and the sleeve 102 is biased towards the member 98 by a compression spring 106 acting between the flange 104 and the plate 8. As shown in FIG. 1 an elliptical frame 107 is pivoted by a pin 108 on a bracket 109 mounted on the plate 8. The frame 107 is extended to form a handle 110 and is fitted with pins 111 which extend into the circumferential groove 105 in the sleeve 102.

Operation of the handle 110 to pivot the frame 107 on the pin 108 retracts the internally splined sleeve 102 to the position shown in FIG. 2 so that the ratchet teeth 103 on the sleeve 102 are disengaged from the ratchet teeth 99 on the member 98. Thus the crank handle 78 is freed to be rotated clockwise to lower the television camera 1 as the reel 5 is rotated anti-clockwise. The camera 1 is retained in any lowered position by release of the handle 110 to allow re-engagement of the ratchet teeth 103 with the ratchet teeth 99. On rotation of the crank handle 78 anti-clockwise the ratchet teeth 103 and 99 ride over each other and the reel 5 is rotated clockwise so that the camera 1 is raised.

It is arranged that when the camera 1 is in the fully raised position the television cable 41 in the drum 24 is tightly wound around the block 30 as shown in FIG. 3. Rotation of the reel 5 anti-clockwise to lower the camera 1 consequently rotates the block 30 and the connector plug 40 anti-clockwise so that the number of turns of the cable 41 in the drum 24 is decreased (with consequent increase of the average diameter of the turns). A point is eventually reached when there is a single turn of the cable 41 in the drum 24 extending round the periphery of the drum. It is arranged that this point is reached when the television camera 1 is in the half lowered position i.e. when half the cable 2 has been wound off from the reel 5. Further lowering of the camera 1 causes the cable 41 to be rewound around the block 30 in the opposite sense to that shown in FIG. 3 until when the fully lowered position of the camera 1 is reached the cable 41 is once again tightly wound around the block 30. The spring 35 assists the cable 41 in the unwinding process. In raising the camera 1 from the lowered position the above process operates in reverse.

The cable 41 leads from the drum 24 to a television monitoring system which is thus directly connected with the camera 1. Coolant gas is fed to the camera 1 where it is required to operate in conditions of high ambient temperature such as may exist in the fuel element channels of a nuclear reactor. The coolant gas is admitted into the hub 6 through the gas connector socket 73 and the bush 71 and then passes to the camera 1 through the pipe 20 and the hose 3.

We claim:
1. Winding apparatus comprising a length of flexible cable; a rotatable reel for storage of the cable; supporting means for the reel; means securing the length of cable at an intermediate point thereon to the reel and thus dividing the length into two sections, one section being wound onto the reel, the other section being wound off the reel in the form of a flat spiral coil disposed co-axially to the reel but remote therefrom; means for rotating the reel to wind and unwind the one section of the cable on and off the reel; a spring strip interwound with the turns of the flat spiral coil and pivotally fixed at one end to the supporting means and pivotally fixed at the other end for co-axial rotation with the reel; the said spring strip and spiral coil progressively unwinding through a lesser number of larger turns to a single turn during the rotation of the reel to unwind half of the one section, the said spring strip and spiral coil progressively rewinding in the opposite sense during the rotation of the reel to unwind the second half of the one section.

2. Winding apparatus according to claim 1 and further comprising a flexible tubular member in which the said one section of the cable wound on the reel is enclosed, and means for connecting the interior of said tubular member to a source of fluid flow.

References Cited in the file of this patent

UNITED STATES PATENTS

| | | |
|---|---|---|
| 1,446,410 | Bennett et al. | Feb. 20, 1923 |
| 1,868,409 | Crispen | July 19, 1932 |

FOREIGN PATENTS

| | | |
|---|---|---|
| 697,640 | Great Britain | Sept. 23, 1953 |